US007848228B2

(12) United States Patent
Yamamoto

(10) Patent No.: US 7,848,228 B2
(45) Date of Patent: Dec. 7, 2010

(54) COMMUNICATION SYSTEM, COMMUNICATION CARD, AND COMMUNICATION METHOD

(75) Inventor: Kanta Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 510 days.

(21) Appl. No.: 11/362,134

(22) Filed: Feb. 27, 2006

(65) Prior Publication Data
US 2006/0209877 A1    Sep. 21, 2006

(30) Foreign Application Priority Data
Mar. 16, 2005  (JP) .............................. 2005-074815

(51) Int. Cl.
*H04J 3/14*     (2006.01)
*H04J 3/16*     (2006.01)
(52) U.S. Cl. ....................... 370/222; 370/465
(58) Field of Classification Search ......... 370/221, 370/222, 223, 224, 216, 229, 237, 238, 252, 370/465; 709/238, 220, 221, 222; 714/1, 714/2, 3, 4
See application file for complete search history.

(56) References Cited
U.S. PATENT DOCUMENTS
7,002,907 B1 *  2/2006  Chen et al. ................. 370/222

2002/0080437 A1 *  6/2002  Sparks et al. .............. 359/110
2002/0181392 A1    12/2002  Okuno
2003/0021283 A1 *  1/2003  See et al. ................... 370/401
2006/0007854 A1 *  1/2006  Yu ............................. 370/229

FOREIGN PATENT DOCUMENTS
JP    P2002-510160 A    2/2002
JP    2002-359628 A     12/2002
WO    WO 99/37043       7/1999
WO    WO-2004/096697    10/2004

OTHER PUBLICATIONS
Japanese Office Action for Japanese Application No. 2005-074815 mailed on Jun. 8, 2010. A partial English-language translation is provided.

* cited by examiner

*Primary Examiner*—Andrew Lee
(74) *Attorney, Agent, or Firm*—Fujitsu Patent Center

(57) ABSTRACT

A communication system that enhances the efficiency of network operations in response to a request for a transfer bandwidth increased locally. A physical links are installed at a span where a transfer bandwidth is locally increased in a network, and the physical links can cover the increased transfer bandwidth. A load sharing section regards the physical links as one virtual link called a link aggregation, and performs load sharing and outputs data to the plurality of physical links. A collecting section collects data transmitted through the plurality of physical links and outputs the data according to the destination of the data. Any nodes are connected by a link aggregation to configure an RPR ring network having non-uniform transfer bandwidth.

3 Claims, 10 Drawing Sheets

COMMUNICATION SYSTEM, COMMUNICATION CARD, AND COMMUNICATION METHOD

CROSS-REFERENCE TO RELATED APPLICATIONS

This application is based on, and claims priority to, Japanese Application No. 2005-074815, filed on Mar. 16, 2005, in Japan, and which is incorporated herein by reference.

BACKGROUND OF THE INVENTION

1. Field of the Invention

The present invention relates to communication systems, communication cards, and communication methods, and particularly to a communication system that performs communication in a network, a communication card that performs communication in a network, and a communication method for performing communication in a ring network having a redundant structure made by a resilient packet ring (RPR).

2. Description of the Related Art

Information communication networks have been changing from local area networks (LANs) in companies and houses to networks in entire urban areas, that is, wider-area networks. For example, a plurality of Ethernet (registered trademark) LAN environments are connected by the use of Layer-2 switches to form an integrated wide-area 10-gigabit Ethernet (10 GbE), which has been widespread.

Main technologies of information transfer in wide-area networks, including 10 GbEs, include a synchronous optical network/synchronous digital hierarchy (SONET/SDH). The SONET/SDH multiplexes low-speed channels hierarchically to provide higher-speed channels and specifies an interface for effectively multiplexing various types of communication services. The SONET/SDH has been standardized and developments thereof have been advancing. As a topology for wide-area networks, ring networks, where a plurality of nodes are connected in a ring manner, are mainly used.

Currently, SONET/SDH-based ring networks are mainly used as communication backbones of wide-area networks that perform long-distance transfer. A technology called a resilient packet ring (RPR) has recently attracted attention, as a substitute for the SONET/SDH.

The RPR is a new media-access-control (MAC) frame transfer technology which has been being standardized as IEEE 802.17 (its protocol is on a Layer-2 MAC sub-layer like the Ethernet). The RPR does not depend on Layer 1 (uses existing techniques of Layer 1) and implements ring topology.

The RPR can use a transmission-rate series of optical carrier "n" (OC-n) in the SONET or synchronous transport module "n" (STM-n) in the SDH, or a Layer-1 physical layer, which includes 10 GbEs, to transfer IEEE 802.17 MAC frames (RPR frames) in a ring network (RPR over SONET/SDH and RPR over GbE are possible).

FIG. 6 shows the structure of an RPR network 100. The RPR network 100 includes nodes 101 to 106, and is a ring network in which the nodes 101 to 106 are connected in a ring manner by optical fibers. Information moving around the ring network can be dropped to a tributary side, or information is added from a tributary side to the ring network, through the nodes 101 to 106.

The RPR network 100 has a double ring which allows packets to flow in two directions opposite each other. In the figure, packets flow along a ring route F1 clockwise and flow along a ring route F2 counterclockwise. Information is transferred and distributed in units of packets in the RPR whereas information is transferred and distributed in units of streams formed of a plurality of OC or STM channels in the SONET/SDH.

The RPR transfers packets by spatial reuse. Spatial reuse will be described by comparing it with a unidirectional path switched ring (UPSR), which is one operation form of conventional SONET rings.

FIG. 7 is a concept view of the operation of a UPSR. Nodes 111 to 114 are connected in a ring shape to form a ring network. The UPSR is an operation form that avoids a failure by sending data for the current system in one direction of the ring while the data is always sent in the opposite direction for the reserved system and by witching to the reserved system if a failure occurs on the current system.

When the node 114 sends data to the node 111, for example, the node 114 sends the data through a current-system line W and, at the same time, always sends the same data in the opposite direction via a reserved-system line Pr through the nodes 113 and 112 to the node 111 (the node 111 selects, in a normal operation, the data coming from the WEST).

If a line failure occurs in the current-system line W, the line is switched to the reserved-system line Pr to immediately avoid the failure. Since the reserved-system line Pr through the nodes 113 and 112 is not relevant to actual communication in a normal operation, it uses a space wastefully (because it provides time division multiplexing (TDM) transfer, it reduces time slots that can be used in a normal operation).

FIG. 8 shows spatial reuse. Spatial reuse is a function for transferring data in a ring at the shortest path in a normal operation of a network having the ring. As shown in FIG. 8, when each of nodes 101 to 106 transfers data to adjacent nodes in a network 100a, spaces (spans Sp1 to Sp6) are only used between the transmission-side nodes and the receiving-side nodes at the shortest paths.

Assuming that the node 105 sends a packet to the node 106, for example, the node 105 uses only a path P1 in a span Sp5 to send the packet, and does not send it round through a redundant route as in the UPSR. Therefore, with the use of the same transfer bandwidth, communication is allowed between nodes by using spans Sp1 to Sp4 and Sp6, other than the span Sp5. In this way, since the RPR uses spatial reuse, which transfers packets at required zones only, the transfer bandwidth can be effectively used.

As failure-remedy methods in the RPR, IEEE 802.17 defines Wrapping remedy, in which data is sent back at the point where a failure occurs to avoid the failure, and Steering remedy, in which, when a failure is detected, each node calculates paths again to avoid the failure. It is determined that the time required to switch the path between a failure and its recovery is 50 milliseconds or less, which is similar to that in the SONET/SDH.

The RPR also has a FairRate (Fairness) function, which dynamically adjusts the transmission rate of each node. The FairRate function will be described below by referring to FIG. 9. The FairRate function dynamically adjusts the transmission rate of each node according to the traffic state in the entire ring to allow each node to use the ring bandwidth in a fair manner.

In FIG. 9, when a buffer of a node 101 reaches a congestion level and the node 101 detects the congestion in a network 100, the node 101 reports the bandwidth to be obtained to a node 102, which is the next upstream node of the node 101, via the ring opposite to the ring which is in the congestion state. When the node 102 receives the report, it adjusts its own use bandwidth so as not to exceed the bandwidth to be obtained by the node 101. The node 102 also reports the bandwidth to be obtained, to a further upstream node.

Such control is performed at each node in the ring to dynamically adjust the transmission rate of each node to maintain fairness in bandwidth.

As described above, the RPR has features such as effective use of bandwidth with the use of spatial reuse, acquisition of bandwidth fairness with the use of FairRate algorithm, and failure recovery within 50 milliseconds similar to that in the SONET/SDH. It has been highly expected that the RPR can form high-quality, highly reliable networks which can cover various media.

As a conventional technology for increasing the bandwidth of a network, a method for switching a ring node so as to couple with another path of another network in order to increase the transfer capacity has been proposed (for example, at paragraphs [0014] to [0036] and FIG. 1 in PCT International Patent Application Publication No. 2002-510160).

In the standard defined by IEEE 802.17, each node of an RPR ring network sends packets at the same transfer rate. For example, both ring routes F1 and F2 have the same packet transfer rate in FIG. 6, and the same packet transfer rate is used in communication at each of the spans Sp1 to Sp6 in FIG. 8.

In actual network operations, however, uniform traffic occurs in a few cases. When a data center to which a server applies centralized control is connected to a node on an RPR ring, or when headquarters or a large city is located at a specific position in an RPR ring, for example, traffic concentrates at a specific node.

FIG. 10 is a view showing the state of a network 100b where a load concentrates on a specific node. The network 100b differs from the network 100 shown in FIG. 6 in that a server 101a performing centralized control is connected to a node 101.

Packets added at nodes 102 to 106 are all transferred to and dropped at the node 101. In an optical fiber, which is a physical transfer path, at a span Sp6 between the nodes 101 and 106, three logical paths are provided, and the bandwidth of the optical fiber is close to its limit.

As described above, since an RPR ring network provides the same transfer rate anywhere, even if a local bandwidth needs to be increased, it is necessary to increase the bandwidth in the same way at all spans.

When a ring is configured with a transfer capacity of 100 Mbps, for example, if it is necessary to provide a transfer capacity of 200 Mbps for an optical fiber at the span Sp6 in the clockwise direction, the bandwidth should also be increased to 200 Mbps in all optical fibers at the spans Sp1 to Sp5 (in this case, the bandwidth should be increased to 200 Mbps also in the counterclockwise direction).

Then, a portion where a transfer capacity of 100 Mbps is sufficient, such as a path P2 in the span Sp5 is configured to have a transfer capacity of 200 Mbps. This means that the conventional RPR network operations are not efficient.

When traffic is increased locally to approach the limit of the transfer bandwidth, if a transmission request exceeding the physical transfer bandwidth is generated, the conventional RPR needs to configure an RPR network having a greater capacity. To increase the bandwidth at a specific span, it is actually necessary to install a new optical interface card having a large capacity in the entire RPR ring network having a maximum of 255 nodes. The time and cost required for this system configuration are enormous, and it is very inefficient.

SUMMARY OF THE INVENTION

In view of the foregoing, it is an object of the present invention to provide a communication system that flexibly handles a request for a transfer bandwidth locally increased, transfers packets efficiently, and has an improved efficiency in network operations.

Another object of the present invention is to provide a communication card that flexibly handles a request for a transfer bandwidth locally increased, transfers packets efficiently, and has an improved efficiency in network operations.

Still another object of the present invention is to provide a communication method that flexibly handles a request for a transfer bandwidth locally increased, transfers packets efficiently, and has an improved efficiency in network operations.

To achieve one of the foregoing objects, one aspect of the present invention provides a communication system for performing communication in a network. The communication system includes a plurality of physical links installed at a span where a transfer bandwidth is locally increased in the network, the plurality of physical links being capable of covering the increased transfer bandwidth; a first node to which a first communication card is mounted, the first communication card including a load sharing section for regarding the plurality of physical links as one virtual link called a link aggregation, and for performing load sharing and outputting data to the plurality of physical links; and a second node to which a second communication card is mounted, the second communication card including a collecting section for collecting data transmitted through the plurality of physical links and for outputting the data according to the destination thereof.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
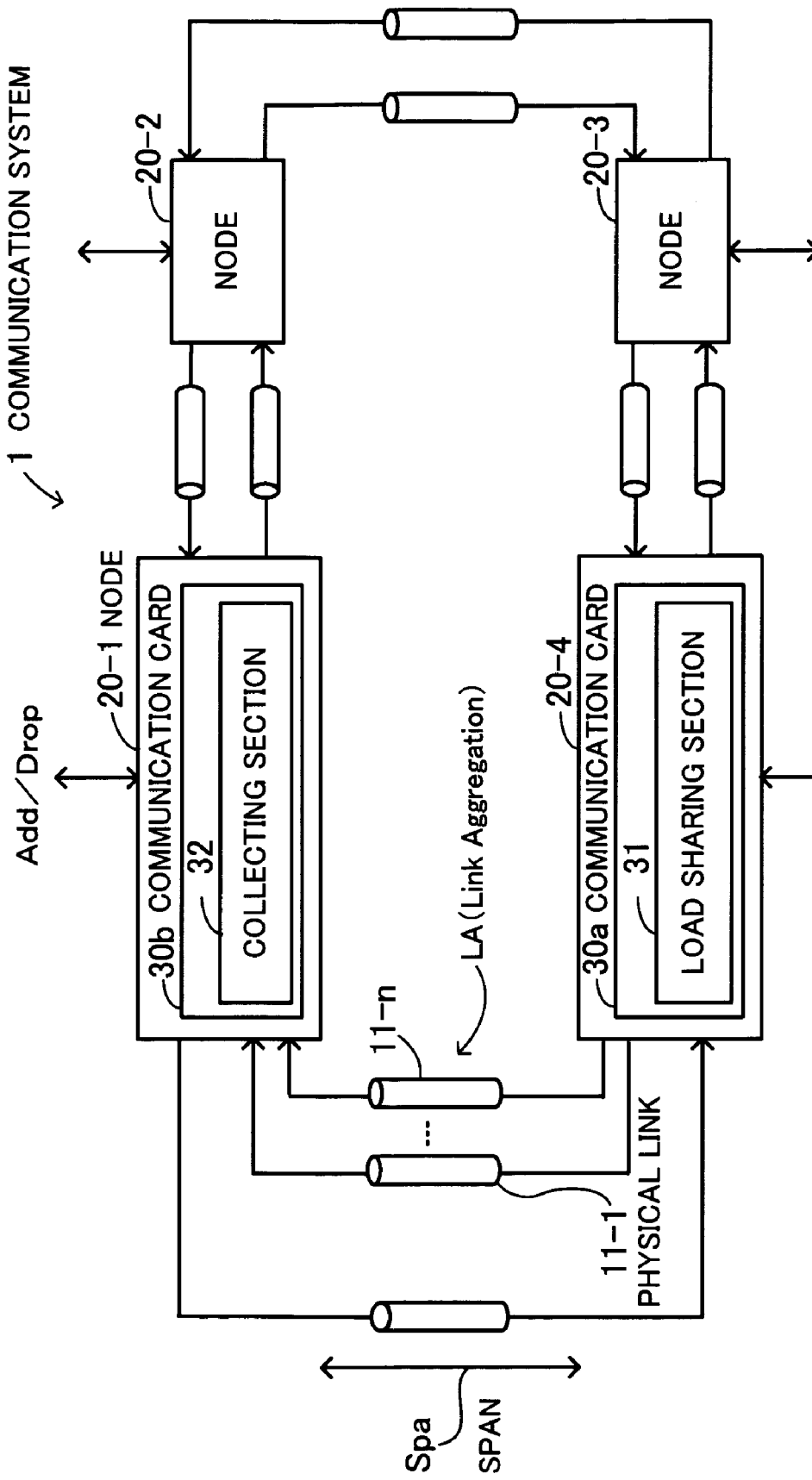
FIG. 1 is a view showing the principle of a communication system according to an embodiment of the present invention.

An embodiment of the present invention will be described below by referring to the drawings. FIG. 1 shows the principle of a communication system 1 according to an embodiment of the present invention. The communication system 1 includes nodes 20-1 to 20-4 connected in a ring manner, and has a double-ring network formed of a clockwise ring route and a counterclockwise ring route. Added information or information to be dropped are transferred in this network.

A plurality of physical links (optical fibers) 11-1 to 11-n is provided at a span Spa where the transfer bandwidth is locally increased in the network, and is capable of covering the increased transfer bandwidth. When a transfer bandwidth of 10 Gbps provided by one optical fiber is increased to 30 Gbps, a total of three optical fibers is installed.

A communication card 30a is mounted to the node 20-4, which serves as the transmission-side node of the span Spa. The communication card 30a has a load sharing section 31. The load sharing section 31 uses the plurality of physical links 11-1 to 11-n as a link aggregation (hereinafter called an LA), and shares the load to output data to the plurality of physical links 11-1 to 11-n. An LA is a way of connection that regards a plurality of physical links as one virtual link and defined in IEEE 802.3ad.

A communication card 30b is mounted to the node 20-1, which serves as the receiving-side node of the span Spa. The communication card 30b has a collecting section 32. The collecting section 32 collects the data sent via the plurality of physical links 11-1 to 11-n, and outputs the data according to its destination (for example, drops data at the node 20-1 or sends data to the node 20-2). The load sharing section 31 and the collecting section 32 are actually included in one communication card (hereinafter called a communication card 30).

Figure 2:
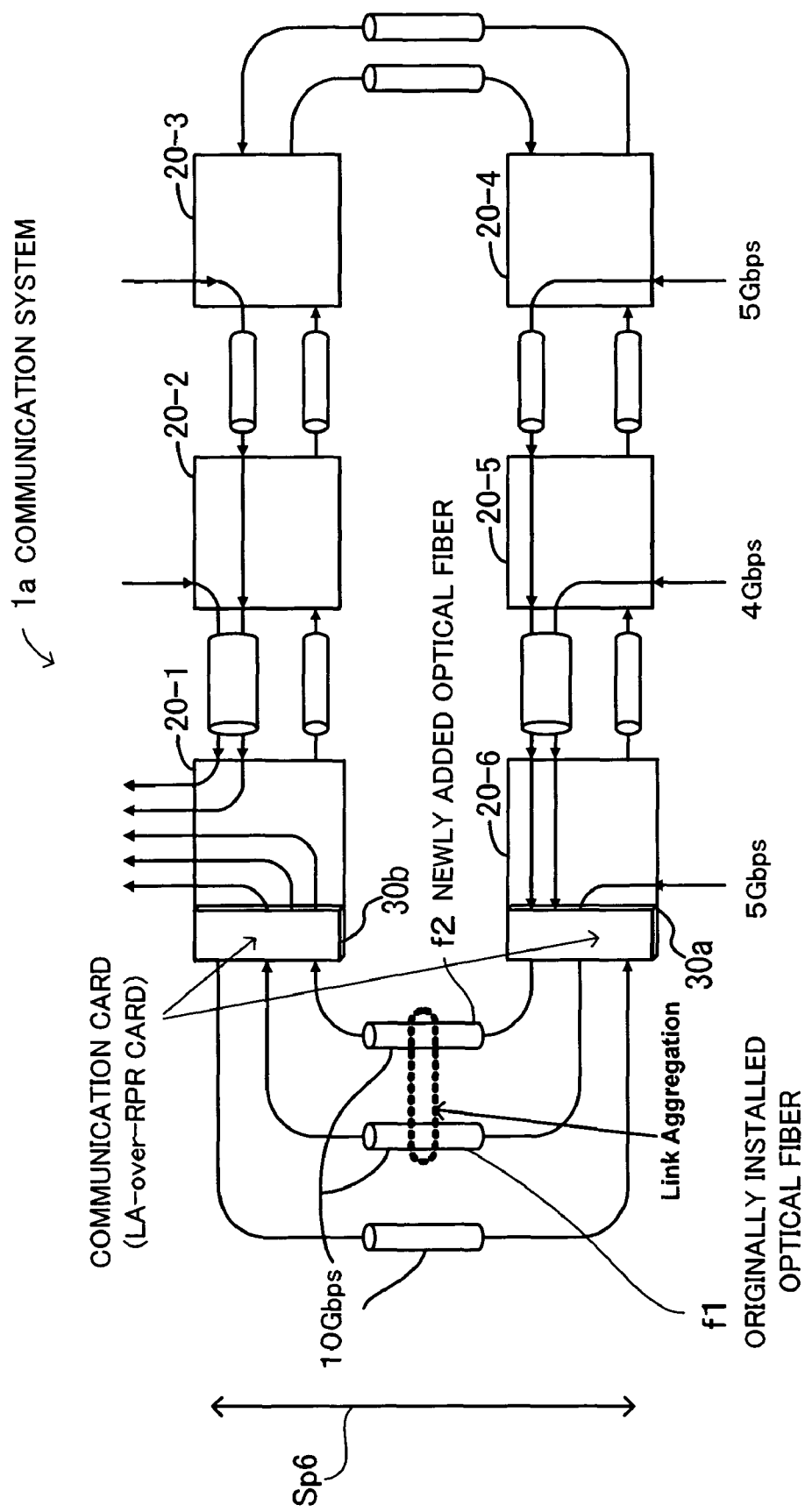
FIG. 2 shows the operation of a communication system in an RPR ring network.

A case in which the communication system 1 is applied to an RPR ring network will be described next. FIG. 2 shows the operation of a communication system 1a in an RPR ring network. The communication system 1a includes nodes 20-1 to 20-6, and the nodes 20-1 to 20-6 are connected with a double ring. Because a server that performed centralized control, not shown, is connected to the node 20-1, or for some reason, packets added at the nodes 20-2 to 20-6 are all transferred to the node 20-1.

It is assumed here that an RPR of 10 Gbps is currently configured (packets are transferred clockwise and counter-clockwise at 10 Gbps) and packet transfer is performed in a bandwidth not-guaranteed class (such as ClassB-EIR or ClassC), which is not a bandwidth guaranteed class.

Before a description with FIG. 2, a packet transfer difference between a bandwidth guaranteed class and a bandwidth not-guaranteed class will be described. It is assumed that packets are transferred clockwise at 10 Gbps in a network having a maximum physical bandwidth of 10 Gbps, a channel failure occurs, and the channel is switched to the counter-clockwise route. When packets are transferred at 10 Gbps also counterclockwise, the packets being transferred counter-clockwise need to be discarded if the packets being transferred clockwise are to be transferred counterclockwise.

Therefore, in a bandwidth guaranteed class, half the physical bandwidth is used, for example, to guarantee the remaining bandwidth for a case when a failure occurs. In the above example, this means that packets are transferred clockwise at 5 Gbps. If a channel failure occurs, and the channel is switched to the counterclockwise route, when packets are transferred at 5 Gbps also counterclockwise, both packets can be transferred counterclockwise at a maximum physical bandwidth of 10 Gbps, which means the bandwidth is guaranteed. Conversely, when packets are transferred in a bandwidth not-guaranteed class, which does not need to guarantee the bandwidth, a path can be set for up to the maximum physical bandwidth.

In FIG. 2, at a span Sp6 between the nodes 20-6 and 20-1, paths from the nodes 20-4, 20-5, and 20-6 to the node 20-1 are established. When the total of bandwidths in the paths is equal to or less than 10 Gbps, no problem occurs. If a bandwidth more than 10 Gbps is desired, the physical bandwidth between the nodes 20-6 and 20-1 is insufficient.

When a path of 5 Gbps is established from the node 20-4 to the node 20-1 and a path of 4 Gbps is established from the node 20-5 to the node 20-1, for example, even if a path of 5 Gbps is to be set from the node 20-6 to the node 20-1, the path is limited to have up to 1 Gbps, which is the maximum clockwise bandwidth for which a path can be set.

An idea of establishing a path from the node 20-6 to the node 20-1 counterclockwise may occur while being aware of its inefficiency. Even in that case, if the total of the bandwidths of paths from the nodes 20-2 and 20-3 to the node 20-1 is 10 Gbps, a limitation is imposed on the link from the node 20-2 to the node 20-1, and another path cannot be set there.

Since a bandwidth of 4 Gbps lacks in the link from the node 20-6 to the node 20-1 in the above case, a link of 10 Gbps is added to configure an LA having a bandwidth of 20 Gbps.

Configuration Step 1

A communication card 30a of 10 Gbps is mounted to the node 20-6, a communication card 30b of 10 Gbps is mounted to the node 20-1, and an optical fiber of 10 Gbps is additionally connected therebetween. Hereinafter, the communication card 30 is called an LA-over-RPR card 30. The originally installed optical fiber is called an optical fiber f1, and the newly added optical fiber is called an optical fiber f2.

Configuration Step 2

An LA function is enabled at the nodes 20-6 and 20-1. With this, loads on the existing paths (paths from the nodes 20-4 and 20-5 to the node 20-1) are shared by LA hash calculation (loads are shared uniformly onto the optical fibers f1 and f2).

Configuration Step 3

The node 20-6 calculates again the bandwidths (FairRate) used in the link from the node 20-6 to the node 20-1. The node 20-6 understands that the available bandwidth is 11 Gbps (=20 Gbps−5 Gbps (with which a path has been set by the node 2-4)−4 Gbps (with which a path has been set by the node 20-5)), and reports FairRates to the source nodes (nodes 20-4 and 20-5). (When the optical fiber f2 is added and the LA function is executed, the node 20-6 calculates again FairRates for the nodes 20-4 and 20-5 and reports them thereto. The nodes 20-4 and 20-5 understand that paths can be set with 5 Gbps and 4 Gbps.)

Configuration Step 4

A path with 5 Gbps is set from the node 20-6 to the node 20-1. As a result, packets can be transferred from the node 20-6 to the node 20-1 through the LA link at a path bandwidth of 14 Gbps.

In the above configuration steps, the path bandwidth can be increased from the node 20-6 to the node 20-1. To increase the path bandwidth from the nodes 20-4 and 20-5 to the node 20-1, the bandwidth may be insufficient from the node 20-5 to the node 20-6. Since an LA link can be configured locally to increase the bandwidth, the bandwidth can be increased in the link from the node 20-5 to the node 20-6, if necessary.

Figure 3:
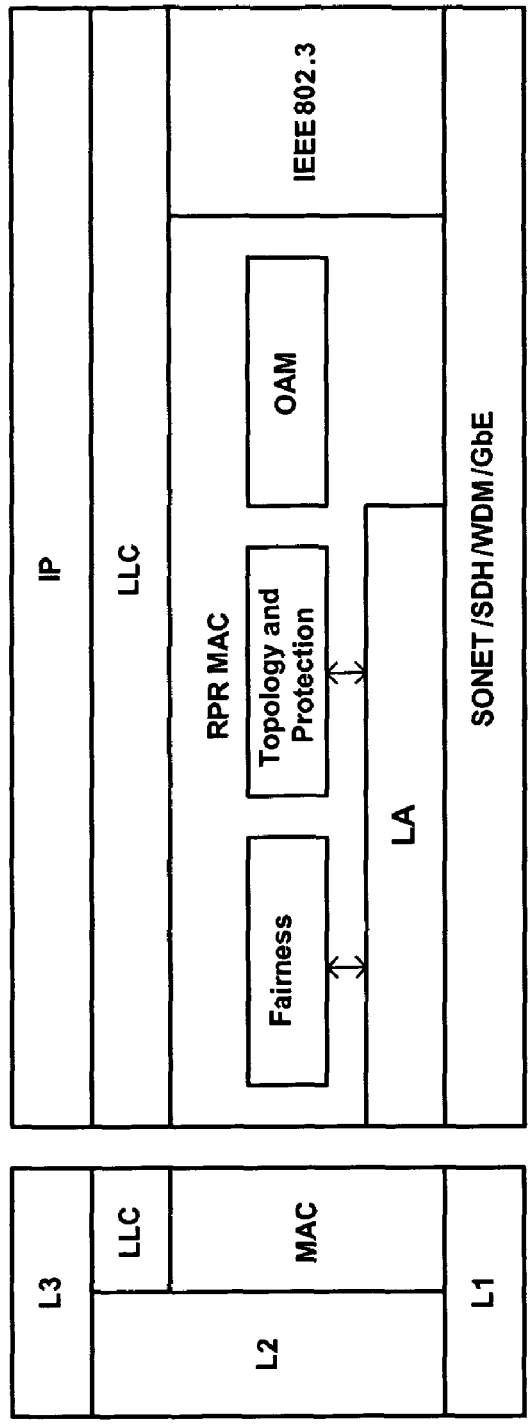
FIG. 3 shows a protocol stack.

A protocol stack will be described next. FIG. 3 shows a protocol stack. The protocol that implements the communication system 1, RPR MAC, is positioned in a MAC sub-layer in Layer 2 (L2).

In Layer 1 (L1), a SONET/SDH, WDM, GbE, or the like is positioned. In the MAC sub-layer, IEEE 802.3 (Ethernet) and RPR MAC are positioned. In RPR MAC, LA is positioned at the bottom; and Topology and Protection for an RPR ring topology and a failure remedy, and Fairness are positioned above LA; and Operation and Maintenance (OAM) is also positioned. A Logical Link Control (LLC) sub-layer is positioned above the MAC sub-layer, and Internet Protocol (IP) is positioned in Layer 3 (L3).

Figure 4:
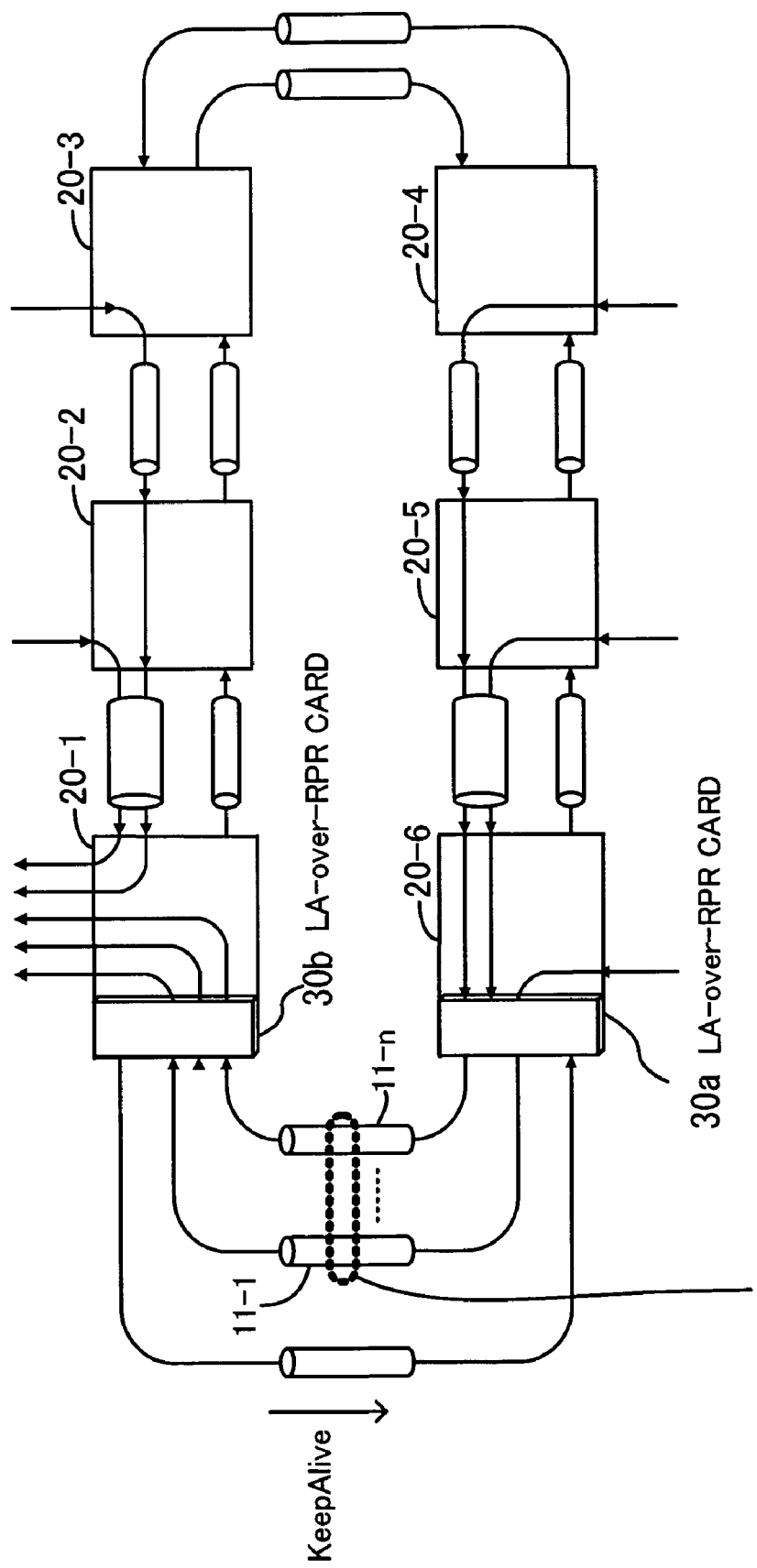
FIG. 4 shows the configuration of a link aggregation (LA) in a unidirectional ring route.

An LA configuration in a unidirectional ring route will be described next. FIG. 4 shows an LA configuration in a unidirectional ring route. The network structure therein is the same as that shown in FIG. 2.

An LA-over-RPR card 30b sends to an LA-over-RPR card 30a a connection-state report for reporting the connection states of a plurality of physical links 11-1 to 11-n via a counterclockwise ring route. A keepalive packet (packet to be periodically transmitted to confirm that a connection is effective on a network) is actually used for this connection-state report.

A load sharing section 31 in the LA-over-RPR card 30a controls load sharing on the plurality of physical links 11-1 to 11-n formed in a clockwise ring route, according to the connection-state report.

A network channel state is exchanged between nodes in this way to always confirm that the channel is normally operating. Therefore, when a span in a ring network locally needs an increased transfer bandwidth, an LA can be generated (a physical link can be increased or reduced) in a unidirectional ring route. A request for a dynamic connection-capacity change generated when a load concentrates at a specific node can be handled with a minimum facility.

Advantage of the communication system 1 will be described next. Since the RPR method conforming to IEEE requires as a prerequisite that a network be configured with a uniform transfer bandwidth, when any specific span needs an increased transfer bandwidth, it is necessary to simply connect the entire RPR ring again with a large capacity to reconfigure it, or to configure another RPR ring to make a double-ring network. According to the communication system 1, described above, the increased transfer bandwidth at any specific span can be flexibly handled with a minimum facility change, efficiently allowing the specific span to have a non-uniform transfer bandwidth.

It is usually difficult for a network configuration party to determine if ununiform traffic occurs when making an RPR ring network. This is because reasons for causing ununiform traffic in the network, such as the establishment of a data center at a city close to the network, an increased population of a city close to the network, and the establishment of the headquarters of a large company at a city close to the network, are issues at the network user side.

Therefore, at the stage when an RPR ring is made, it is unclear that the entire ring should have an LA. To handle a request for increasing the transfer bandwidth at a specific span in a network where an RPR ring conforming to IEEE has been made, it is demanded that the request be handled just at the two nodes located at the ends of the specific span. It is also demanded that the request be handled by the RPR ring with a minimum facility change.

In response to these demands, the communication system 1 is configured to handle the request just by mounting an LA-over-RPR card, which can be easily mounted to and demounted from a node, to each of the two nodes located at the ends of an increased-bandwidth span. This allows an effect caused by the change not to extend to the entire RPR ring in terms of facilities. Since an LA can add its function in an RPR ring as a completely separate layer in an LA over RPR, when an LA is formed in a link between nodes, the other nodes do not need to recognize the LA.

Figure 5:
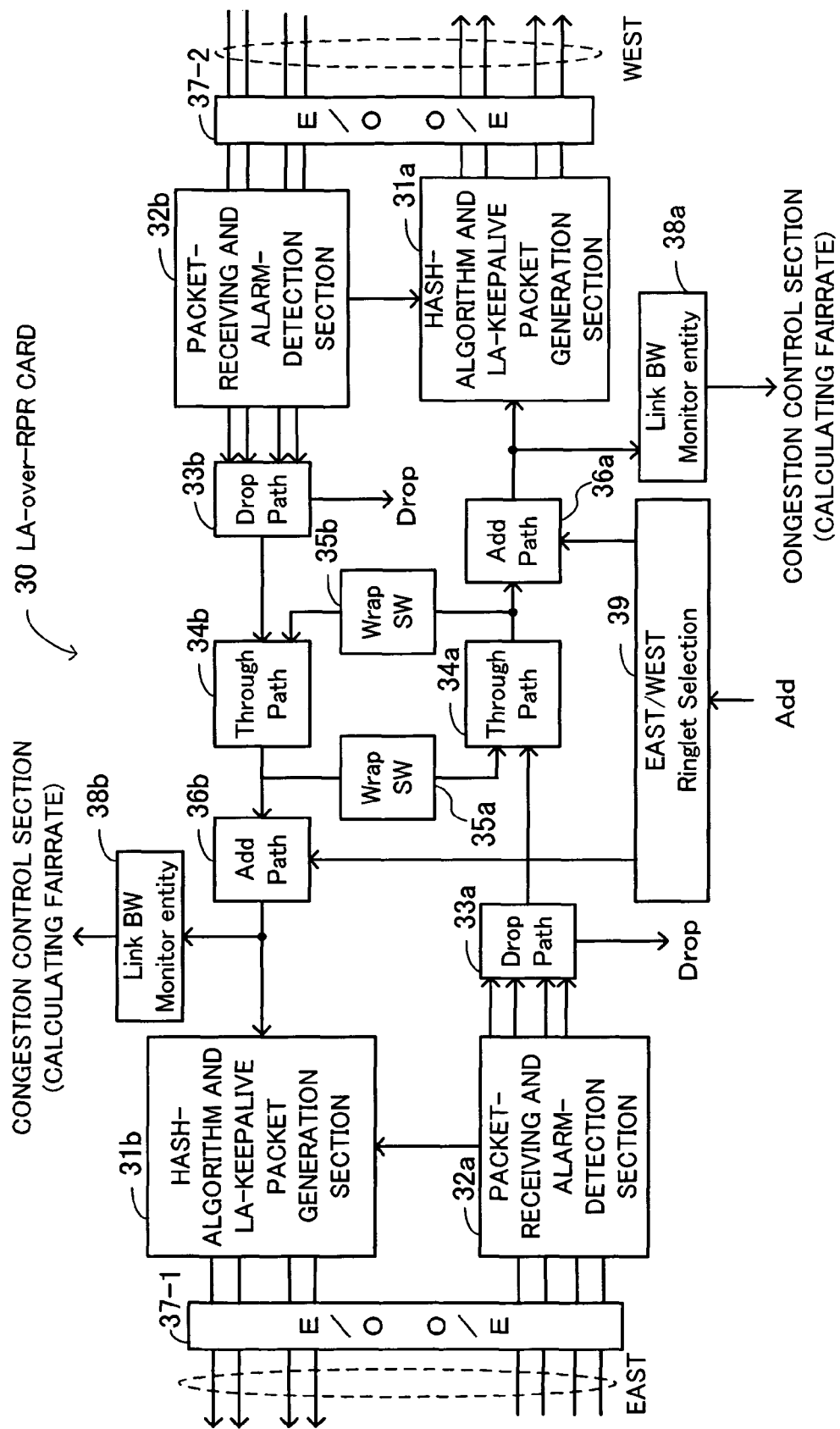
FIG. 5 shows the functional configuration of an LA-over-RPR card.
Figure 6:
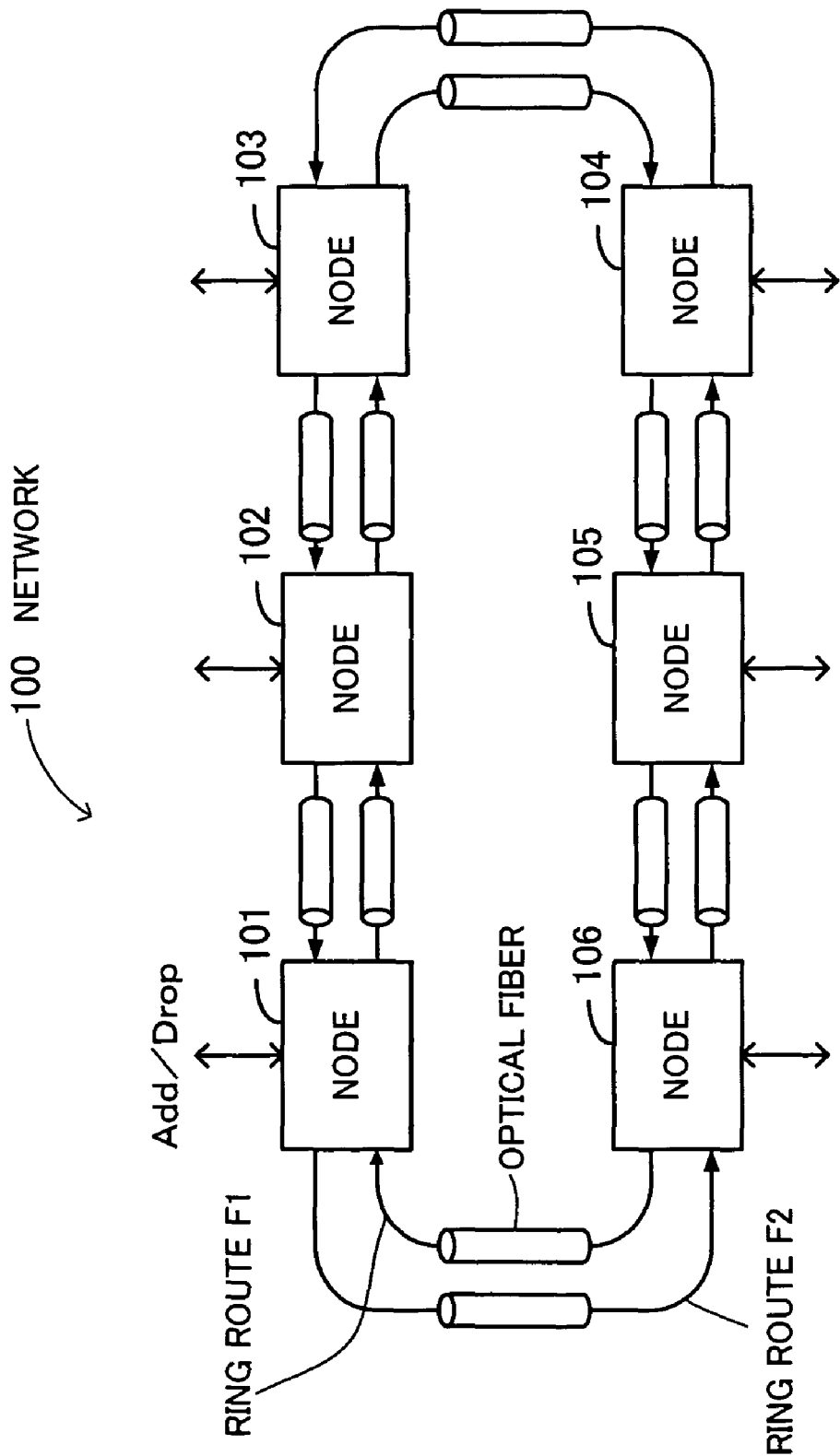
FIG. 6 shows the configuration of an RPR network.
Figure 7:
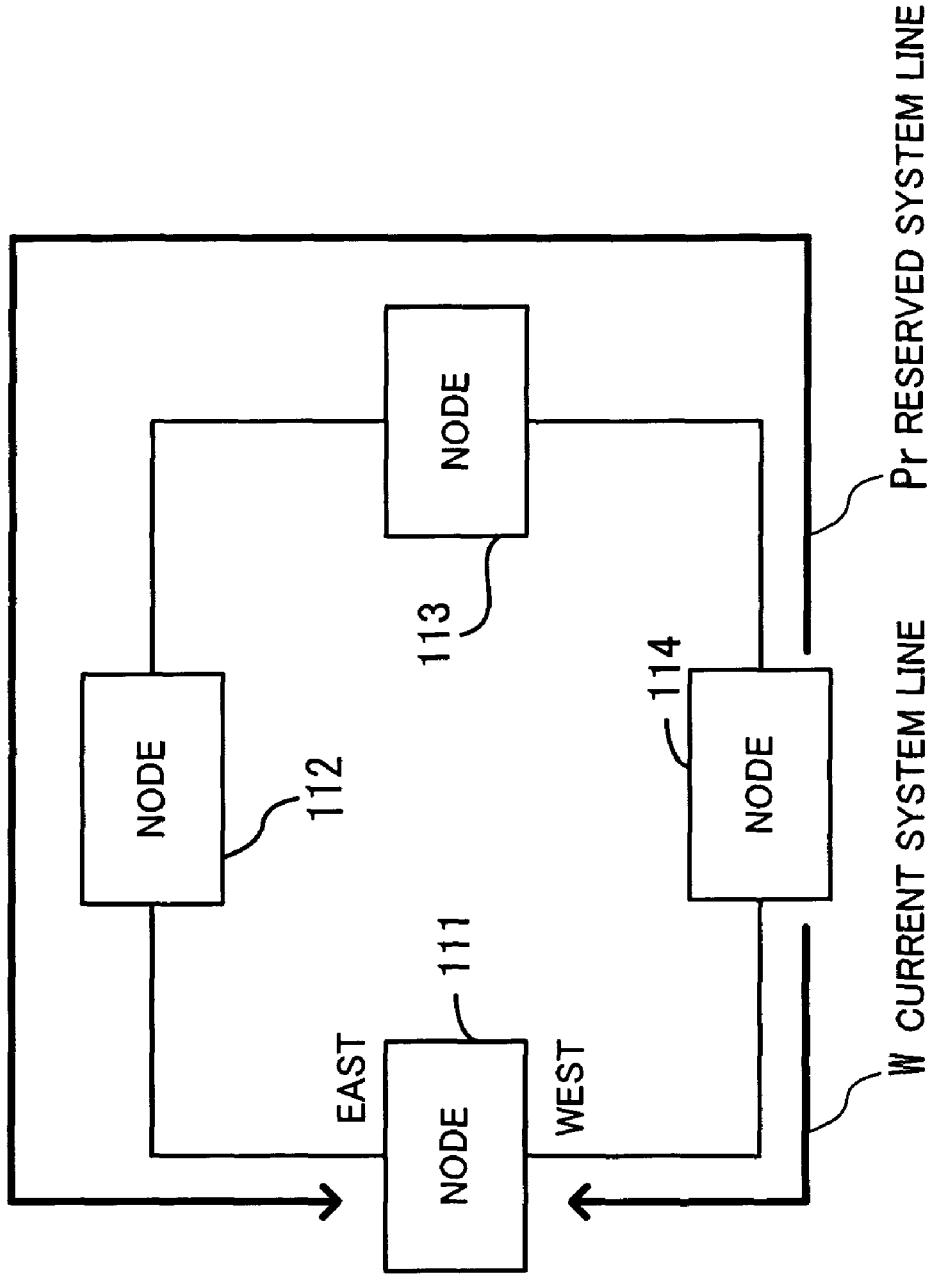
FIG. 7 is a view showing the concept of the operation of a unidirectional path switched ring (UPSR).
Figure 8:
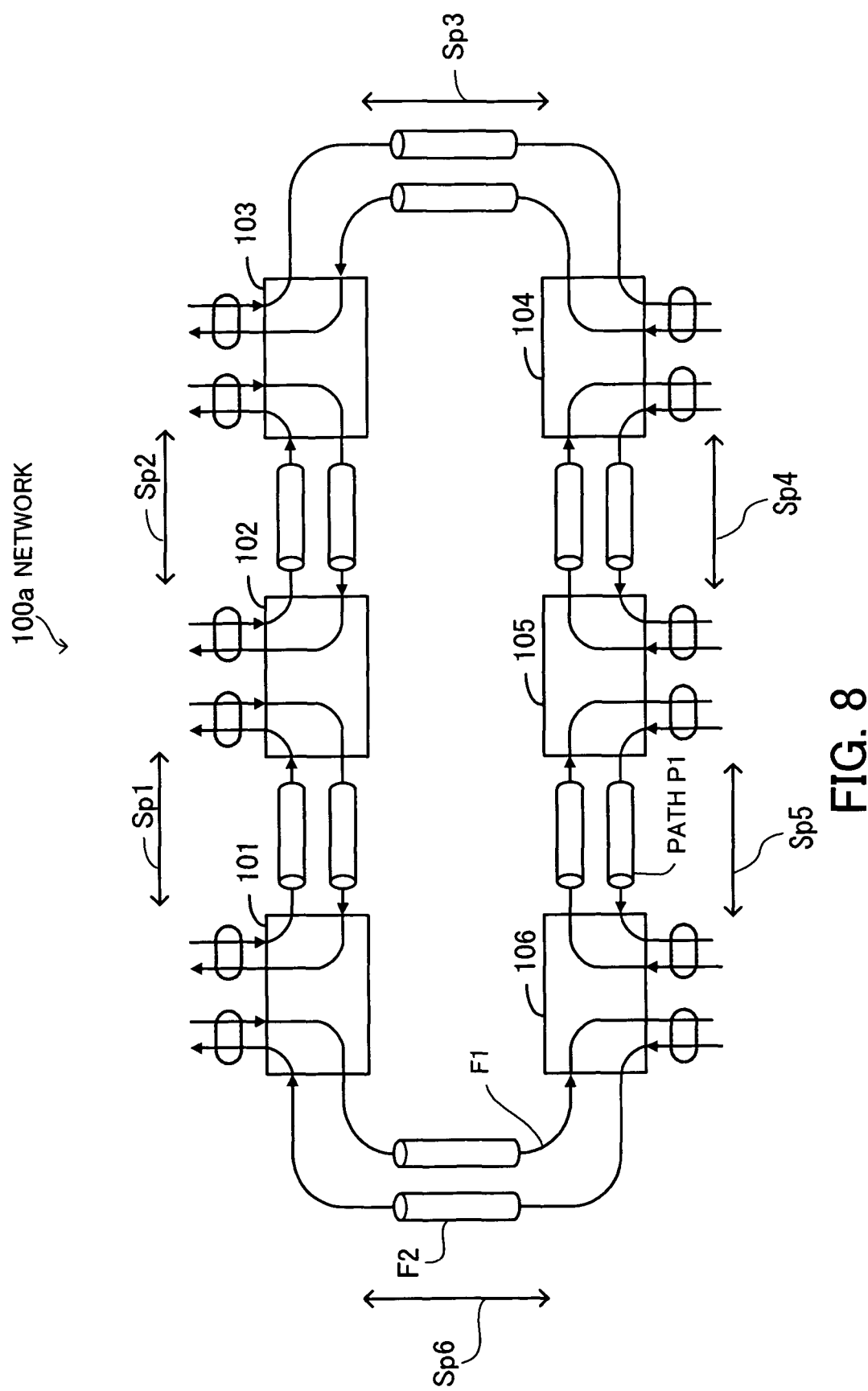
FIG. 8 shows spatial reuse.
Figure 9:
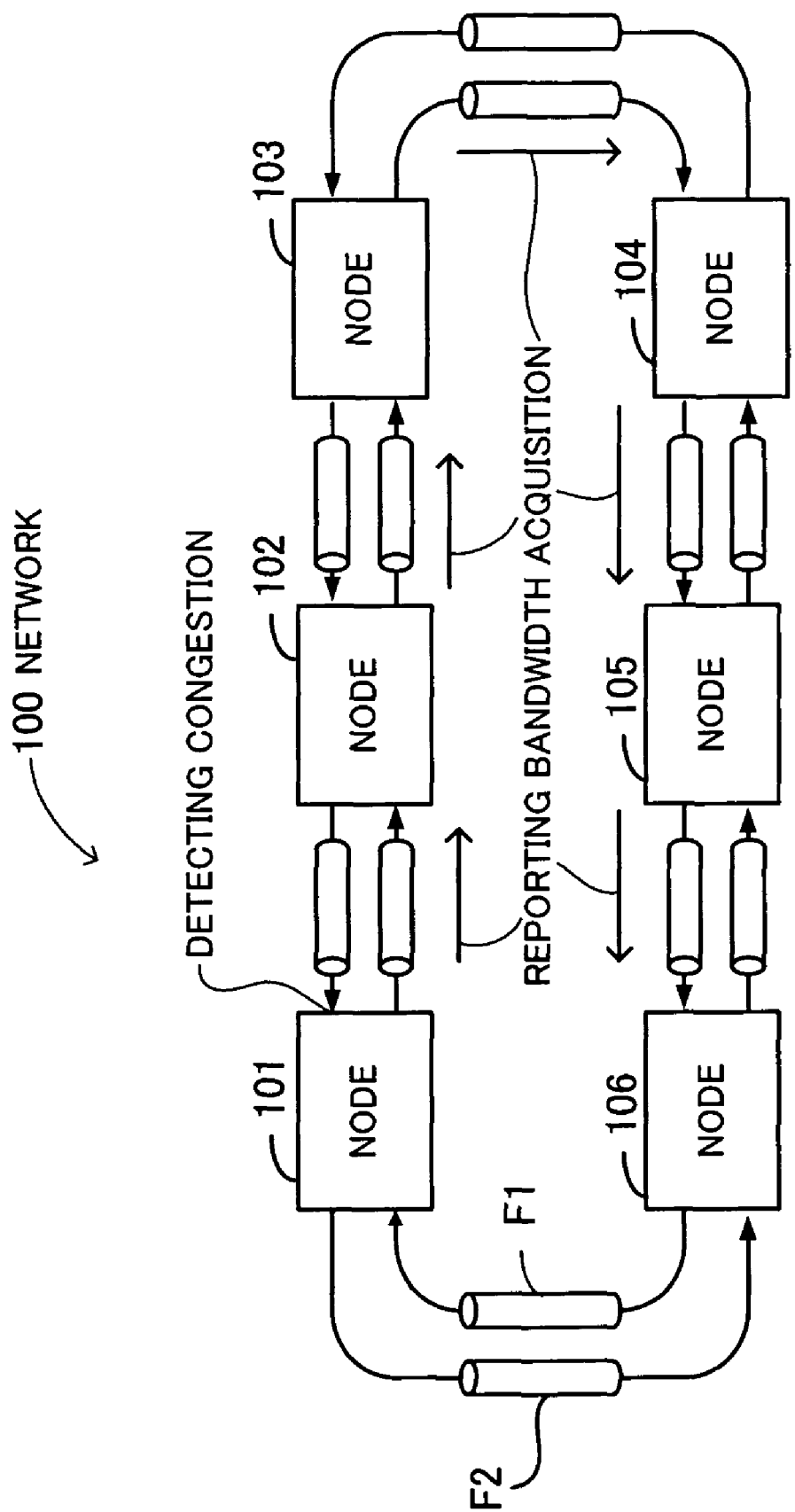
FIG. 9 shows a FairRate function.
Figure 10:
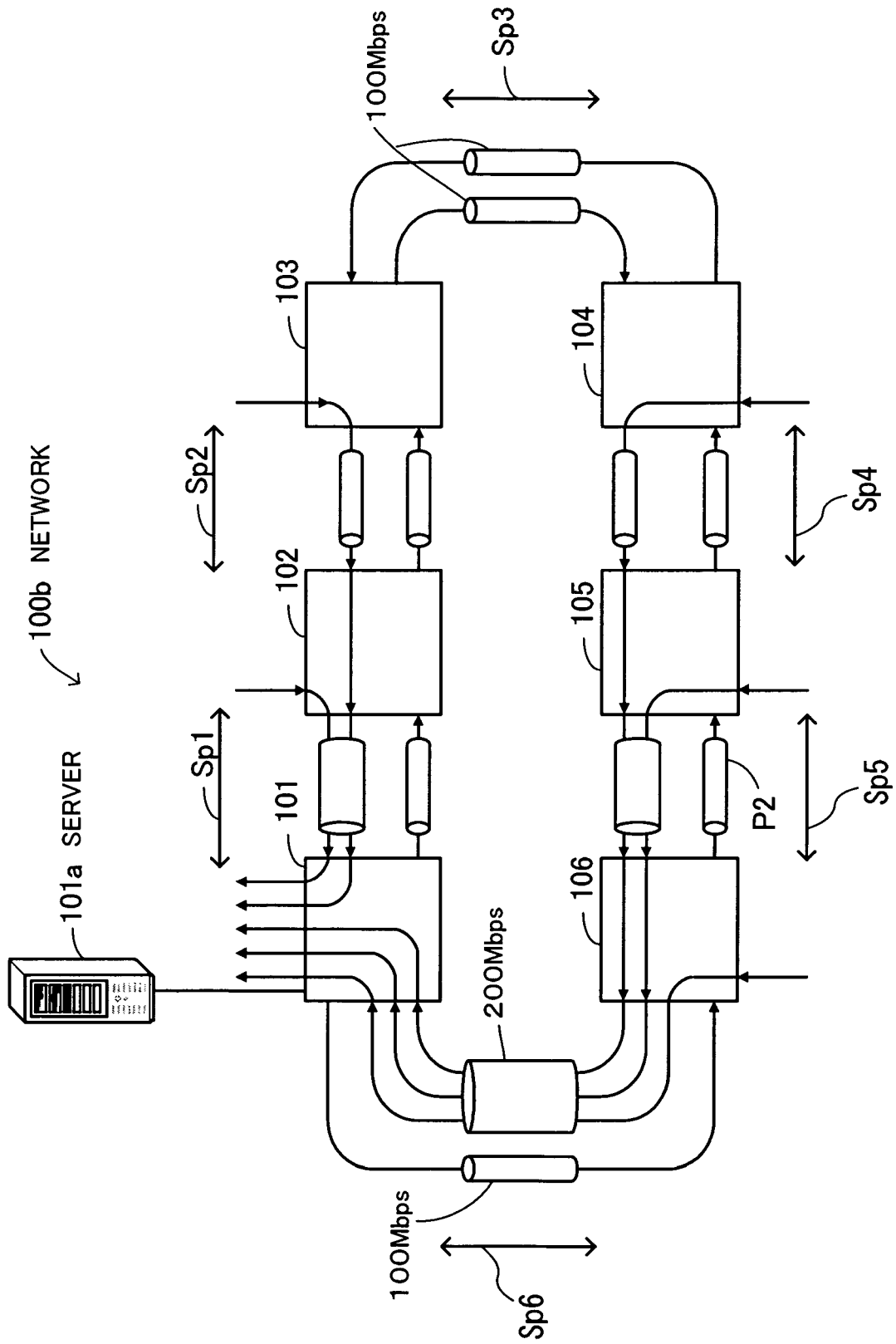
FIG. 10 shows a network state in which a load concentrates on a specific node.

The LA-over-RPR card 30 will be described next. FIG. 5 shows the functional configuration of the LA-over-RPR card 30. The LA-over-RPR card 30 is formed of hash-algorithm and LA-keepalive packet generation sections 31a and 31b, packet-receiving and alarm-detection sections 32a and 32b, drop-path sections 33a and 33b, through-path sections 34a and 34b, wrap switches 35a and 35b, add-path sections 36a and 36b, E/O and O/E sections 37-1 and 37-2, link bandwidth monitor entities 38a and 38b, and an east/west ringlet section 39.

The E/O and O/E sections 37-1 and 37-2 convert an optical signal sent from a remote node to an electric signal to receive it, and converts an electric signal processed by the local node to an optical signal to output it. The hash-algorithm and LA-keepalive packet generation sections 31a and 31b include the function of the load sharing section 31, and performs hash calculation to share the load such that a uniform load is imposed on a plurality of physical links forming an LA. When alarm information is received from the packet-receiving and alarm-detection section 32a or 32b, the received section again performs hash calculation for a normal physical link to share the load. The hash-algorithm and LA-keepalive packet generation sections 31a and 31b also have a function for transmitting and receiving a keepalive packet.

The packet-receiving and alarm-detection sections 32a and 32b include the function of the collecting section 32. The packet-receiving and alarm-detection sections 32a and 32b detect a channel failure alarm, and report alarm information to the hash-algorithm and LA-keepalive packet generation sections 31b and 31a, respectively.

The drop-path sections 33a and 33b select, from received packets, a path to be dropped to drop the selected path to the tributary side, and send the other packets to the through-path sections 34a and 34b.

The through-path sections 34a and 34b send the received packets to the add-path sections 36a and 36b. The wrap switch 35a sends a packet flowing from the west to the through-path section 34a such that a packet flowing from the west is turned back to the west when a failure remedy is applied. The wrap switch 35b sends a packet flowing from the east to the through-path section 34b such that a packet flowing from the east is turned back to the east when a failure remedy is applied.

The add-path section 36a adds a packet sent from the east/west ringlet selection section 39 to the packets sent from the through-path section 34a, and sends them to the hash-algorithm and LA-keepalive packet generation section 31a and to the link bandwidth monitor entity 38a.

The add-path section 36b adds a packet sent from the east/west ringlet selection section 39 to the packets sent from the through-path section 34b, and sends them to the hash-algorithm and LA-keepalive packet generation section 31b and to the link bandwidth monitor entity 38b.

The link bandwidth monitor entities 38a and 38b monitor the transfer bandwidth of the added packet, and report the result of monitoring to a congestion control section, not shown, in the node (the result of monitoring is used for Fair-Rate calculation).

The east/west ringlet selection section 39 determines whether a packet added by the tributary side is to be sent through a path to the east or through a path to the west, and sends the packet to either of the add-path sections 36a and 36b.

As described above, according to a communication system and a communication method of the present invention, a LA-over-RPR card 30 is mounted to each of the nodes located at both ends of a link that lacks a bandwidth due to an increased transfer bandwidth in an RPR network to apply the LA method to the increased transfer bandwidth in a bandwidth not-guaranteed class at the link between the nodes. With this, a request for a dynamic transfer-bandwidth change can be handled promptly, and the efficiency of the network operation can be improved.

A communication system according to the present invention is configured such that a plurality of physical links installed at a span where the transfer bandwidth is locally increased in a network is regarded as a link aggregation to perform load sharing and output data to the plurality of physical links, and to collect data received through the plurality of physical links. With this, a request for a transfer bandwidth locally increased can be flexibly handled; a non-uniform transfer bandwidth can be provided even in an RPR network, defined to have a uniform transfer bandwidth; and the efficiency of the network operation can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for performing communication in an RPR (Resilient Packet Ring) network, the communication system comprising:
   a first physical link and a plurality of second physical links installed at a span where a transfer bandwidth is locally increased in the RPR network, the second physical links being capable of covering the increased transfer bandwidth;
   a first node to which a first communication card is mounted, the first communication card including a load sharing section for regarding the second physical links as one virtual link called a link aggregation, and for performing load sharing and outputting data to the second physical links; and
   a second node to which a second communication card is mounted, the second communication card including a collecting section for collecting data transmitted through the second physical links and for outputting the data according to the destination thereof;
   wherein, when traffic of the first physical link exceeds the transfer bandwidth, the load sharing section enables a link aggregation function and performs the load sharing with the link aggregation and outputs data to the second physical links;
   wherein, when traffic of the first physical link does not exceed the transfer bandwidth, the load sharing section disables the link aggregation function and outputs data to the first physical link;
   and wherein, when the RPR network has an RPR ring form, the second communication card transmits a connection-state report for reporting the connection states of the second physical links to the first communication card through an RPR ring route in one direction, and the load sharing section of the first communication card controls load sharing according to the connection-state report for the second physical links formed on an RPR ring route in the other direction to generate the link aggregation for a unidirectional RPR ring route at the span where the transfer bandwidth is locally increased in the RPR network, and sets a non-uniform transfer bandwidth path at the span.

2. A communication card for performing communication in an RPR (Resilient Packet Ring) network, the communication card comprising:
   a load sharing section for regarding a plurality of reserved physical links installed at a span where a transfer bandwidth increase is requested as one virtual link called a link aggregation, and for performing load sharing and outputting data to the reserved physical links; and
   wherein a current physical link and the reserved physical links are installed at the span and the reserved physical links are capable of covering the increased transfer bandwidth;
   a collecting section for collecting data transmitted through the reserved physical links and for outputting the data according to the destination thereof,
   wherein the communication card is mounted to the nodes located at the ends of the span, where the transfer bandwidth increase is requested, to increase the transfer bandwidth;
   wherein, when traffic of the current physical link exceeds the transfer bandwidth, the load sharing section enables a link aggregation function and performs the load sharing with the link aggregation and outputs data to the reserved physical links;
   wherein, when traffic of the current physical link does not exceed the transfer bandwidth, the load sharing section disables the link aggregation function and outputs data to the current physical link;
   and wherein, when the RPR network has an RPR ring form, a second communication card transmits a connection-state report for reporting the connection states of the reserved physical links to a first communication card through an RPR ring route in one direction, and the load sharing section of the first communication card controls load sharing according to the connection-state report for the reserved physical links formed on an RPR ring route in the other direction to generate the link aggregation for a unidirectional RPR ring route at the span where the transfer bandwidth is locally increased in the RPR network, and sets a non-uniform transfer bandwidth path at the span.

3. A communication method for performing communication in a ring network having a redundant structure generated by an RPR (Resilient Packet Ring), the communication method comprising:
   installing a first physical link and a plurality of second physical links at a span where a transfer bandwidth is locally increased, the second physical links being capable of covering the increased transfer bandwidth;
   mounting a first communication card to a data-transmission-side node, the first communication card performing load sharing and outputting data to the second physical links regarded as one virtual link called a link aggregation; and
   mounting a second communication card to a data-receiving-side node, the second communication card collecting data transmitted through the second physical links, outputting the data according to the destination thereof, and connecting any nodes by a link aggregation to configure an RPR ring network allowing a non-uniform transfer bandwidth;
   wherein, when traffic of the first physical link exceeds the transfer bandwidth, the first communication card enables a link aggregation function and performs the load sharing with the link aggregation and outputs data to the second physical links;
   wherein, when traffic of the first physical link does not exceed the transfer bandwidth, the first communication card disables the link aggregation function and outputs data to the first physical link;
   and wherein the second communication card transmits a connection-state report for reporting the connection states of the second physical links to the first communication card through a ring route in one direction, and the first communication card controls load sharing according to the connection-state report for the second physical links formed on a ring route in the other direction to generate the link aggregation for a unidirectional ring route at the span where the transfer bandwidth is locally increased in the ring network, and sets a non-uniform transfer bandwidth path at the span.

* * * * *